US011249792B1

(12) United States Patent
Ozerkov et al.

(10) Patent No.: US 11,249,792 B1
(45) Date of Patent: Feb. 15, 2022

(54) PERIPHERAL DEVICE MOUNTING BASED ON FILE SYSTEM COMPATIBILITY

(71) Applicant: Parallels International GmbH, Schaffhausen (CH)

(72) Inventors: Konstantin Ozerkov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 17/021,161

(22) Filed: Sep. 15, 2020

Related U.S. Application Data (62) Division of application No. 16/010,760, filed on Jun. 18, 2018, now Pat. No. 10,831,522.

(51) Int. Cl.
| | |
|---|---|
| *G06F 9/455* | (2018.01) |
| *G06F 13/10* | (2006.01) |
| *G06F 16/188* | (2019.01) |
| *G06F 13/16* | (2006.01) |

(52) U.S. Cl.
CPC ........ *G06F 9/45558* (2013.01); *G06F 13/102* (2013.01); *G06F 13/1668* (2013.01); *G06F 16/188* (2019.01); *G06F 2009/45579* (2013.01); *G06F 2009/45583* (2013.01)

(58) Field of Classification Search
CPC .. G06F 9/45558; G06F 16/188; G06F 13/102; G06F 13/1668; G06F 2009/45579; G06F 2009/45583
See application file for complete search history.

(56) References Cited

PUBLICATIONS

Parallels, Parallels Desktop 12 for Mac, User's Guide, http://download.parallels.com/desktop/v12/docs/en_US/Parallels%20Desktop%20User's%20Guide.pdf, 2016, 222 pages.
USPTO, Office Action for U.S. Appl. No. 16/010,760, dated Apr. 2, 2020.
USPTO, Notice of Allowance for U.S. Appl. No. 16/010,760, dated Jun. 23, 2020.

*Primary Examiner* — Gregory A Kessler
(74) *Attorney, Agent, or Firm* — Rosenberg, Klein & Lee (57) ABSTRACT

Systems and methods for managing peripheral devices associated with host computer systems running virtual machines. An example method comprises: detecting, by a host computer system, a plug-in event associated with a peripheral device; identifying a type of a file system of the peripheral device; selecting, among a group of execution environments comprising the host computer system and one or more virtual machines, an execution environment having a highest compatibility metric value associated with the type of the file system; and responsive to determining that the execution environment is provided by a virtual machine, causing a guest agent running on the virtual machine to mount the peripheral device to the virtual machine.

20 Claims, 6 Drawing Sheets

|      | Host (Mac) | VM1 (Win) | VM2 (Lin) | VM3 | Cloud |
|------|------------|-----------|-----------|-----|-------|
| NTFS | 50%        | 100%      | 75%       | ... | ...   |
| HFS  | 100%       | 0%        | 50%       | ... | ...   |
| APFS | 100%       | 0%        | 0%        | ... | ...   |
| EXT4 | 0%         | 0%        | 100%      | ... | ...   |
| etc. |            |           |           |     |       |

PERIPHERAL DEVICE MOUNTING BASED ON FILE SYSTEM COMPATIBILITY

RELATED APPLICATIONS

This application is a divisional of U.S. patent application Ser. No. 16/010,760 filed on Jun. 18, 2018, the entire content of which is incorporated by reference herein.

TECHNICAL FIELD

The present disclosure is generally related to virtualized computer systems, and is specifically related to systems and methods for managing peripheral devices associated with host computer systems running virtual machines.

BACKGROUND

Virtualization may be viewed as presenting various hardware components as logical objects in order to allow a computer system to execute various software modules, for example, multiple operating systems, concurrently and in isolation from other software modules. Virtualization may be achieved by running a software layer, often referred to as a "virtual machine monitor" or "hypervisor," above the hardware and below the virtual machines. A hypervisor may provide interfaces between the underlying hardware and virtual devices of virtual machines. For example, processor virtualization may be implemented by the hypervisor scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for managing peripheral devices associated with host computer systems running virtual machines. Examples of peripheral devices include mountable storage devices (such as flash memory cards, flash memory sticks, compact disks, hard disk drives (HDDs) or solid state drives (SSDs)) and various other input/output (I/O) devices.

A host computer system may run a virtual machine monitor (VMM) managing one or more virtualized execution environments, such as virtual machines, each of which may run a guest operating system (OS), which in turn manages one or more guest applications. The VMM may be running at an elevated privilege level to emulate the underlying hardware platform (e.g., the x86 platform), including processors, memory, and peripheral devices (such as network interface controllers, hard disk controllers, flash memory cards and sticks, compact disks, etc.). In certain implementations, virtual machine management functions (such as virtual machine creation, execution, and termination) may be performed by a virtualization application running in a non-privileged execution mode in the user space of the host.

In common implementations, removable peripheral devices (such as flash memory cards and sticks, compact disks, hard disk drives (HDDs) or solid state drives (SSDs), etc.) may, upon plugging-in to the host computer system, be mounted to the host OS, which may interact with them via block storage drivers and export their respective file systems via a file system sharing protocol (e.g., Server Message Block (SMB), Common Internet File System (CIFS), or Network File System (NFS)), thus making the file systems available to one or more virtual machines running on the local host computer systems and/or one or more cloud-based virtual machines running on remote host computer systems.

A removable peripheral device may support one or more of a variety of file systems, including New Technology File System (NTFS), Hierarchical File System (RFS), Apple File System (AFPS), Ext4, etc. Conversely, the host OS of the host computer system may fully support certain file systems, while only partially supporting another group of file systems, and failing to support yet another group of file systems.

In certain implementations, a virtual machine running on a host computer system may be employed for executing the software that was originally developed for a platform that is different from the native platform of the host computer system. Therefore, the guest OS of the virtual machine may support a file system that is not supported by the host computer system, or may provide a better support for a file system which is only partially supported (e.g., by allowing read only operations) by the host OS. However, in common implementations, a peripheral device would be mounted to the host computer system even if the host computer system fails to fully support the file system type of the peripheral device, thus preventing the virtual machine from performing at least certain operations with respect to peripheral device file system, despite the fact that the guest OS of the virtual machine may be fully compatible with the file system type of the peripheral device.

The present disclosure addresses the above-noted deficiencies of common implementations and thus improves the functionality and efficiency of virtualized execution environments implemented by general purpose or specialized computing devices, by providing the systems and methods of mounting a peripheral device to an execution environment (e.g., the host OS or the guest OS of a local or cloud-based virtual machine) having the best compatibility with the file system of the peripheral device. In an illustrative example, a host computer system may, responsive to detecting a peripheral device plug-in event, read and analyze the peripheral device metadata in order to identify the file system type of the peripheral device. Upon identifying the file system type, the host computer system may select, among the virtual machines running on the local or remote host computer system and the host computer system itself, an execution environment which has the best compatibility with the identified file system type. If the best compatibility with the identified file system type is demonstrated by one of the virtual machines running on the local or remote host computer system, the latter may notify a guest agent running on the virtual machine of the peripheral device plug-in event, thus causing the guest OS to mount the peripheral device. Conversely, if the best compatibility with the identified file system type is demonstrated by the local host computer system itself, the peripheral device may be mounted to the local host computer system. Upon mounting the peripheral device, the mounting execution environment may export the peripheral device file system via a file sharing protocol, thus making the files available to other virtual machines and/or to the local host OS, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

Figure 1:
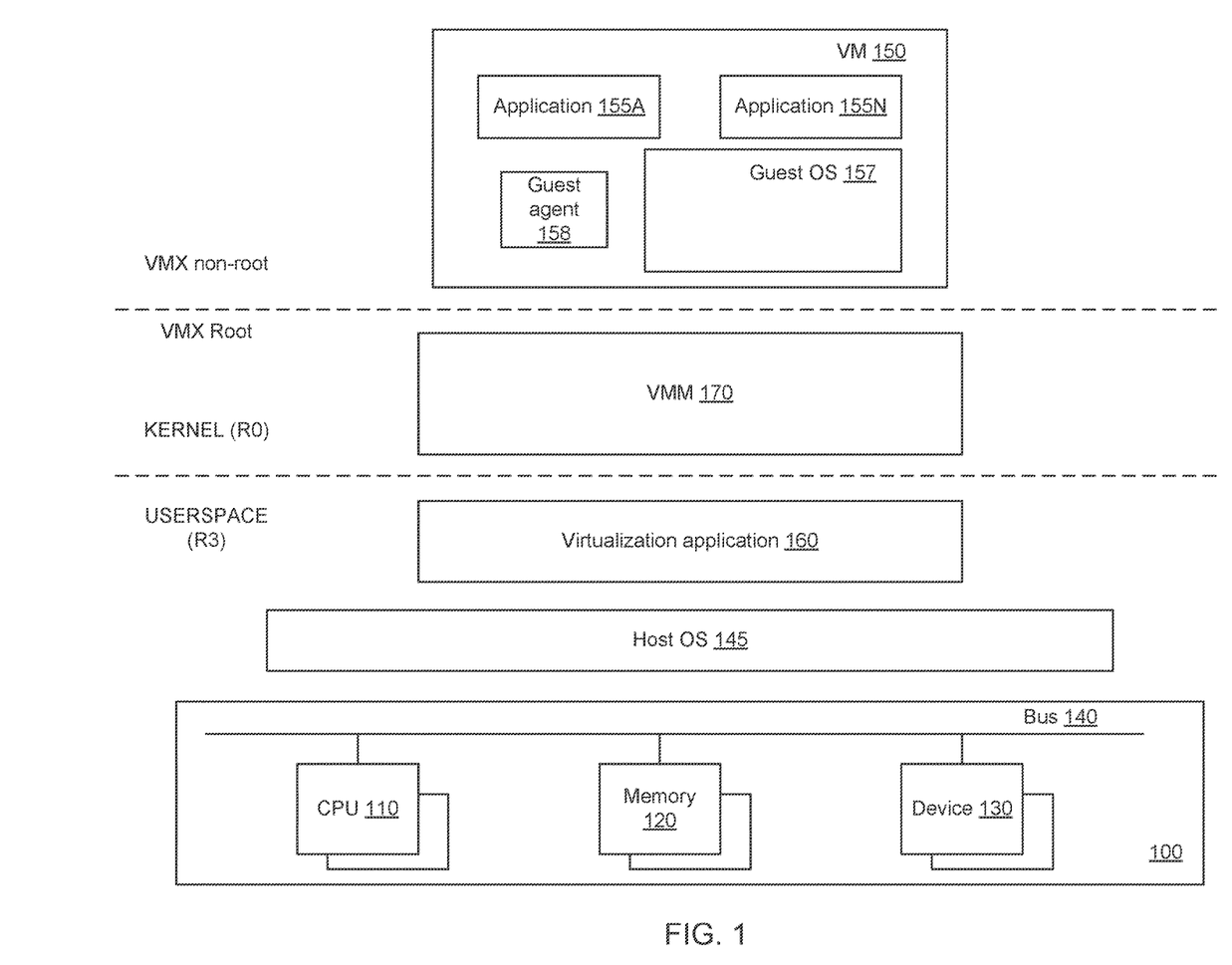
FIG. 1 depicts a high-level diagram of an example virtualized execution environment operating in accordance with one or more aspects of the present disclosure.

FIG. 1 depicts a high-level diagram of an example virtualized execution environment operating in accordance with one or more aspects of the present disclosure. The host computer system 100 may include one or more central processing units (CPU) 110, also referred to as "processors" herein, which may be communicatively coupled to one or more memory devices 120 and one or more peripheral devices 130 via a system bus 140.

"Processor" herein refers to a device capable of executing instructions encoding arithmetic, logical, or I/O operations. In one illustrative example, a processor may follow von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices. Certain peripheral devices, such as flash memory cards, compact disks, HDDs, or SSDs, may be hot-pluggable to the host computer system.

The computer system 100 may utilize certain hardware-assisted virtualization features of the processor 110 to facilitate executing, at an elevated privilege level, a VMM 170 that manages one or more virtual machines. While a single VM 150 is shown in FIG. 1 for clarity and conciseness, the computer system 100 may utilize the techniques described herein for running multiple virtual machines.

In various implementations, the VMM 170 may be implemented as a kernel module, a kernel extension, a driver, or a part of the host operating system (OS) 145. The VMM 170 may provide, to the virtual machine 150, one or more virtual processors implemented as execution threads running on one or more physical CPUs, while retaining selective control of processor resources, physical memory, interrupt management, and input/output (I/O). A virtual machine 150 may implement a software environment which may be represented by a stack including a guest operating system (OS) 157 and one or more applications 155A-155N. Each virtual machine 150 may operate independently of other virtual machines and use the VMM-facilitated interface to the processors, memory, storage, graphics, and I/O provided by the host platform 100.

A transition from the VMM execution mode (also referred to as VMX root operation in certain processor architectures) to the guest execution mode (also referred to as VMX non-root operation) is referred to as a VM entry and may be performed by invoking a special Instruction Set Architecture (ISA)-dependent instruction (e.g., VMLAUNCH/VMRESUME or VMRUN instructions). The reverse transition, i.e., transition from the guest execution mode to the VMM execution mode is referred to as a VM exit and is initiated by the processor in response to detecting one of the triggering events (such as an attempt to execute a certain privileged instruction or to access a certain memory address). Thus, when executed in the guest execution mode, certain instructions and events, instead of their ordinary operation, cause VM exits to the VMM 170. Because these VM exits modify the virtual processor's ordinary behavior, the functionality of software in the guest execution mode is limited by certain pre-configured restrictions for the code being executed. It is this very limitation that allows the VMM to retain the full control of processor resources and prevent the virtual machine from executing an operation that would corrupt the host state. Because the guest execution mode places restrictions even on software running on the virtual processor with the current privilege level (CPL) of zero, the guest software may run at the privilege level for which it was originally designed.

In the absence of hardware-assisted virtualization support by the processor 110, binary translation may be implemented for translating instructions to be executed by the virtual machine 150 to the instruction set supported by the processor 110 and/or for shifting the execution privilege levels in the guest execution mode.

In certain implementations, various virtual machine management functions (such as virtual machine creation, execution, and termination) may be performed by the virtualization application 160 running in a non-privileged execution mode in the user space of the host computer system 100. The virtualization application 160 may include a separate processing thread for each virtual processor (vCPU) of the virtual machine(s) 150. Within each thread, the virtualization application 160 may invoke the functions of the VMM 170 for performing the platform emulation or getting access to the run-time data of the virtual machine(s) 150. In certain implementations, the virtualization application 160 may further implement a GUI intercepting user input and displaying graphical output generated by the virtual machine.

Certain instructions executed and/or certain events occurring in the guest execution mode may cause VM exits, which are processed by the VMM 170, which may pass the VM exit reason and other relevant information to the virtualization application 160, which thus exercises control over the execution of the virtual machine 150.

In certain implementations, the local host computer system 100 may communicate, via one or more networks, with one or more remote host computer systems running one or more virtual machines, referred herein to as "cloud-based virtual machines" (not shown in FIG. 1).

Figure 2:
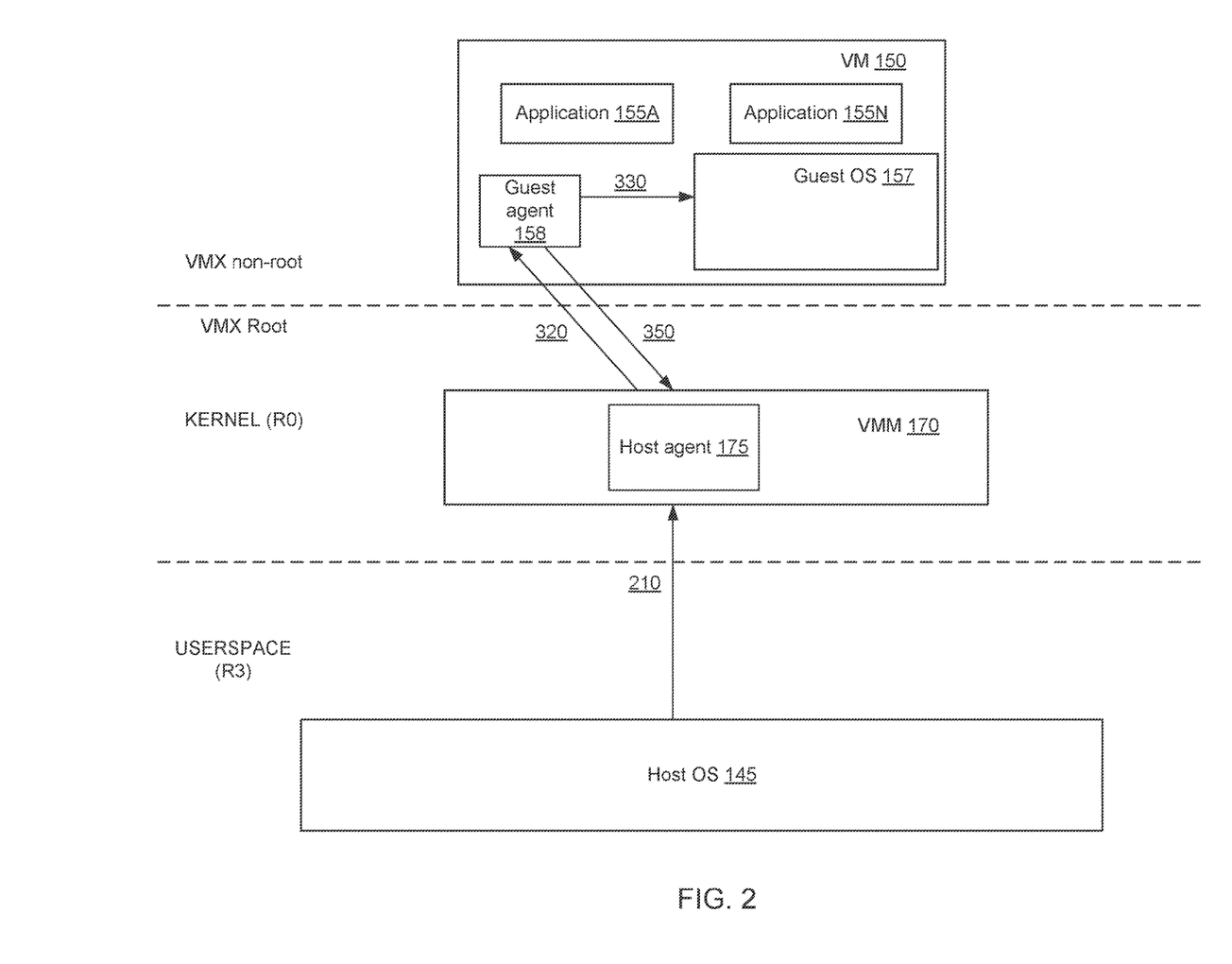
FIG. 2 schematically illustrates an example sequence of interactions of components of the host computer system and one or more virtualized execution environments for managing peripheral devices, in accordance with one or more aspects of the present disclosure.

As noted herein above, plugging a removable peripheral device into a suitable interface (e.g., a Universal Serial Bus (USB) socket) of the host computer system may trigger the device mounting sequence which includes identifying the file system type, identifying an execution environment which has the best compatibility with the identified file system type, and mounting the peripheral device by the identified execution environment. FIG. 2 illustrates an example sequence of interactions of components of the host computer system and one or more virtualized execution environments for managing peripheral devices, in accordance with one or more aspects of the present disclosure. While a single VM 150 is shown in FIG. 1 for clarity and conciseness, the computer system 100 may utilize the techniques described herein for running multiple virtual machines. Furthermore, in certain implementations, the list of virtualized execution environments which are considered for mounting the peripheral device may include a cloud-based execution environment (e.g., one or more cloud-based virtual machines running on one or more remote hosts).

In certain implementations, peripheral device management functions implementing the methods of the present disclosure may be performed by one or more software components, including the host agent 175 and the guest agent 158. While in FIG. 2 the host agent 175 is shown as a component of the VMM 170, in various other implementations, functions of the host agent 175 may be performed by a software module running in the kernel space or the user space of the host computer system. Similarly, functions of the guest agent 158 may be performed by a software module running in the kernel space or the user space of the VM 150.

In certain implementations, the host agent 175 may register with the host OS 145 for receiving certain device status notifications, such as device plug-in event notifications. In an illustrative example, the host agent 175 may execute the RegisterDeviceNotification Windows® API call in order to receive status notifications (e.g., DBT_CONFIGCHANGED device events indicating that the current configuration has changed, due to a dock or undock, DBT_DEVICEARRIVAL event device events indicating that a device has been plugged in, etc.) associated with device types that are specified by the parameters of the RegisterDeviceNotification call. Alternatively, the host agent 175 may employ other techniques for receiving peripheral device status notifications, e.g., installing a custom filtering driver associated with storage class driver to intercept certain device-specific events.

As schematically illustrated by FIG. 2, the host agent 175 may receive, from the host OS 145, a notification 210 of a device plug-in event. Responsive to receiving the notification 210, the host agent 175 may read and analyze the peripheral device metadata in order to identify the file system type of the peripheral device. Upon identifying the file system type, the host agent 175 may select, among one or more virtual machines (running on the local host computer system or a remote host computer system) and the host computer system itself, an execution environment which has the best compatibility with the identified file system type.

Figure 3:
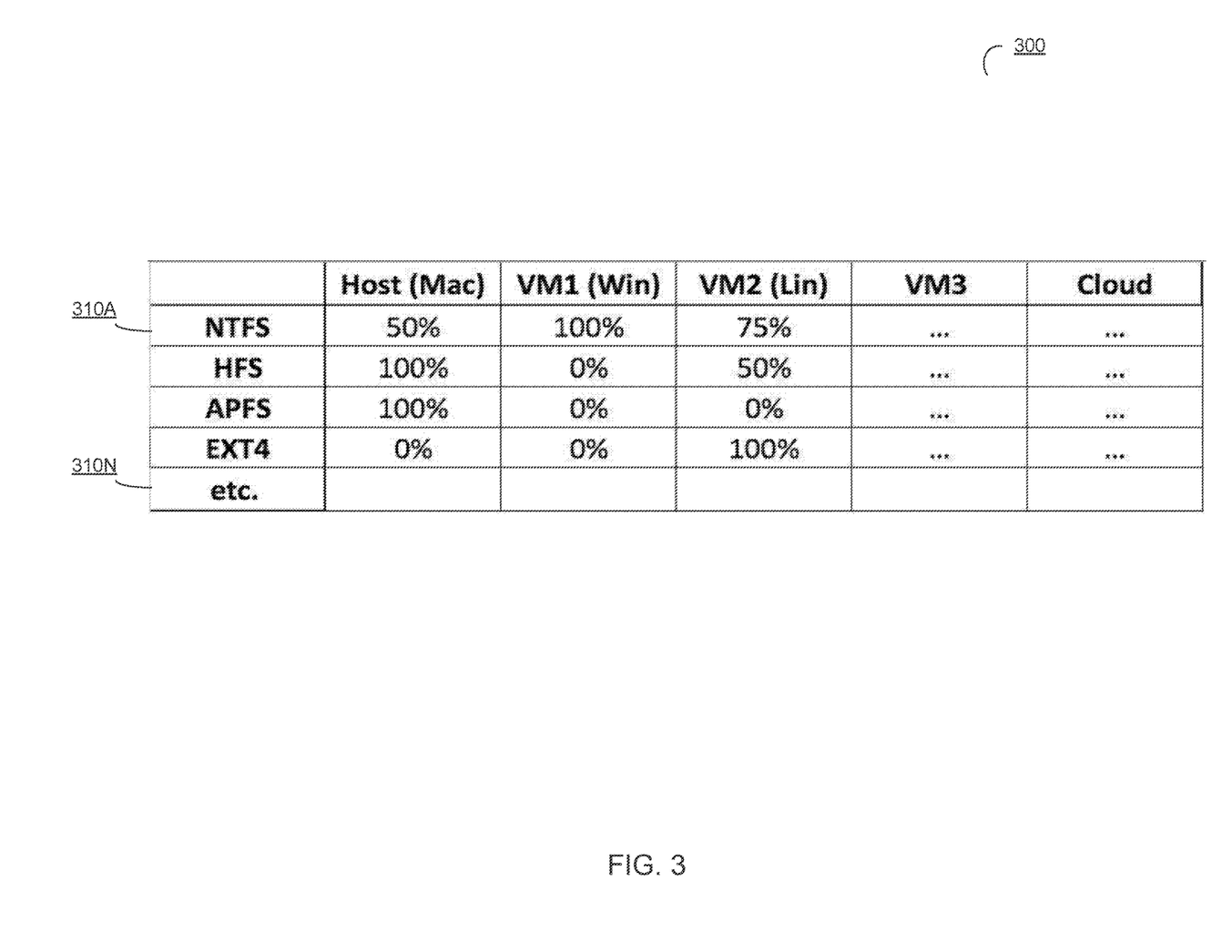
FIG. 3 schematically illustrates an example data structure, each record of which specifies a compatibility metric value of a certain file system type and a certain execution environment, in accordance with one or more aspects of the present disclosure.

In an illustrative example, selecting the execution environment for mounting the peripheral device may involve looking up the file system type in a data structure, each record of which specifies a compatibility metric value of a certain file system type and a certain execution environment, as schematically illustrated by FIG. 3. In an illustrative example, the data structure 300 may be provided by a two-dimensional array comprising a plurality of rows 310A-310N, such that each row corresponds to a file system type and includes a vector of compatibility metric values of the file system type and an execution environment identified by the index of the vector element (i.e., the column of the two-dimensional array 300). The execution environments corresponding to the columns of the two-dimensional array 300 may include the host OS, one or more guest OS of the virtual machines running on the host, and/or one or more cloud-based execution environments (e.g., cloud-based virtual machines). The compatibility metric value may be measured as a share (e.g., percentage) of the full compatibility, such that the full compatibility (e.g., 100%) indicates the full support of the file system by the corresponding execution environment (including read and write operations), while the partial compatibility (e.g., 50% or 75%) indicates only partial support of the file system by the corresponding execution environment (e.g., read-only operations, or read-write operations without support for compressed files), and zero compatibility (e.g., 0%) indicates no support of the file system by the corresponding execution environment.

If the best compatibility with the identified file system type is demonstrated by one of the virtual machines (e.g., virtual machine 150 of FIG. 2) running on the local or remote host computer system, the host agent 175 may notify (320) the guest agent 158 running on the virtual machine 150 of the peripheral device plug-in event, thus causing the guest OS 157 to mount the peripheral device. The notification 320 may include the identifier of the I/O host interface to which the peripheral device is connected, the file system type, and/or other information necessary for mounting the peripheral device by the virtual machine 150. Responsive to receiving the notification 320, the guest agent may execute one or more system calls (330) to the guest OS 157 in order to install and/or activate an appropriate device driver for the peripheral device, and initialize the peripheral device. Responsive to completing the peripheral device mounting operations, the guest agent 158 may notify (350) the host agent 175 of mounting the peripheral device by the virtual machine. The guest agent may further export the peripheral device file system via a file sharing protocol (e.g., Server Message Block (SMB), Common Internet File System (CIFS), or Network File System (NFS)), thus making the files available to the host OS 145, other virtual machines running on the host computer system, and/or one or more cloud-based virtual execution environments.

If the best compatibility with the identified file system type is demonstrated by one of the cloud-based virtual machines running on a remote host computer system, the interactions (320, 250) between the host agent 175 and the guest agent 158 are performed via one or more networks (not shown in FIG. 2).

Conversely, if the best compatibility with the identified file system type is demonstrated by the host OS 145, the peripheral device may be mounted by the host OS 145. Upon mounting the peripheral device, the host OS 145 may export the peripheral device file system via a file sharing protocol, thus making the files available to one or more virtual machines running on the host OS and/or to one or more cloud-based virtual execution environments. If the best compatibility with the identified file system type is demonstrated by one of the cloud-based virtual machines running on a remote host computer system, the host storage may be exported to the cloud-based virtual machine via a block device sharing protocol (e.g., Internet Small Computer Systems Interface (iSCSI) or Network Block Device protocol (NBD)).

Figure 4:
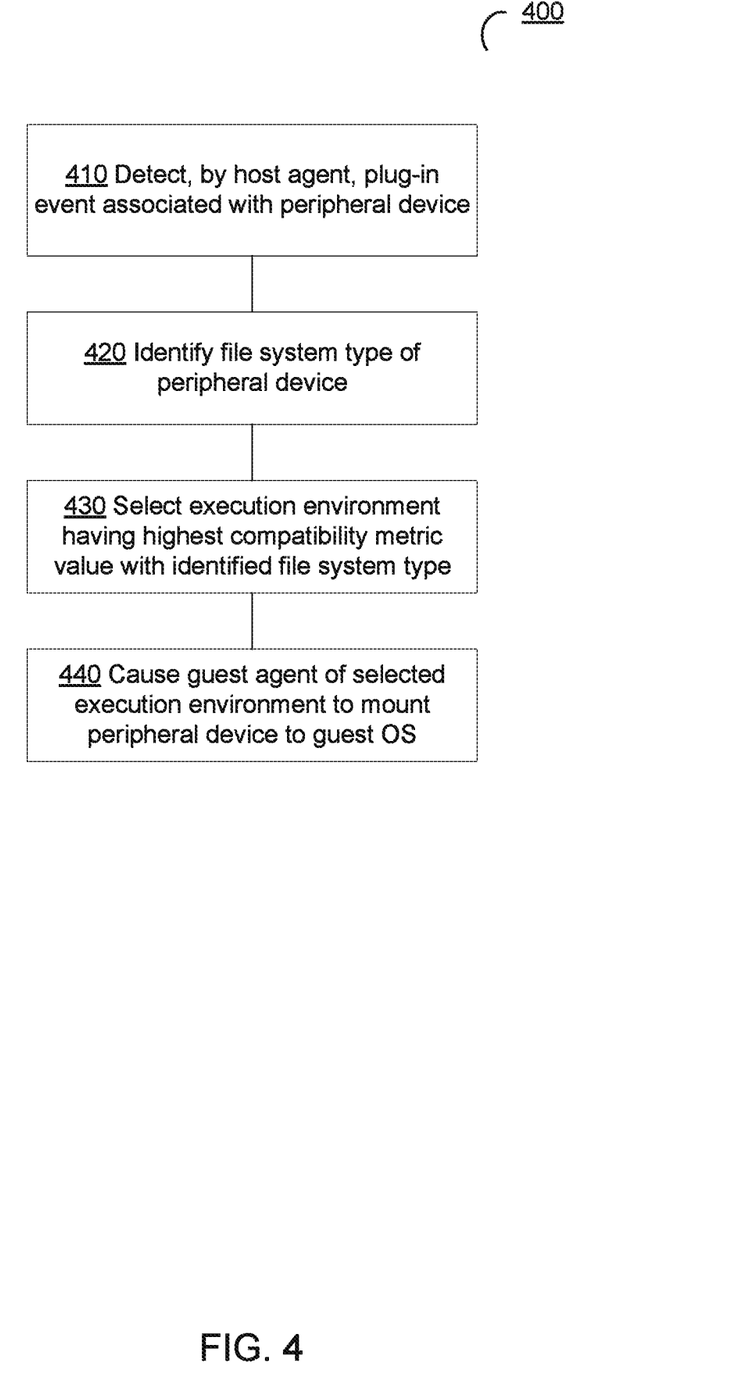
FIGS. 4-5 depict flow diagrams of example methods of managing peripheral devices associated with host computer systems running virtual machines, in accordance with one or more aspects of the present disclosure.

FIG. 4 depicts a flow diagram of one illustrative example of method 400 of managing peripheral devices associated with host computer systems running virtual machines, in accordance with one or more aspects of the present disclosure. Method 400 employs the host agent 175 to select the best compatible execution environment for mounting a plugged-in peripheral device and causes the guest agent 158 to mount the peripheral device under the guest OS 157, as described herein above with reference to FIG. 2. Method 400 and/or each of its individual functions, routines, subroutines, or operations may be performed by one or more processors of the computer system (e.g., the host computer system 100 of FIG. 1) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the host agent implementing the method may detect a plug-in event associated with a peripheral device. In an illustrative example, the host agent may receive a notification of a device plug-in event from the host OS, as described in more detail herein above.

At block 420, the host agent may identify the file system type of the peripheral device, e.g., by reading the peripheral device metadata, as described in more detail herein above.

At block 430, the host agent may select, among a group of execution environments, an execution environment having the highest compatibility metric value associated with the identified file system type. In an illustrative example, the group of execution environments may include the host OS, one or more virtual machines running on the host, and/or one or more cloud-based virtualized execution environments (e.g., cloud-based virtual machines). In certain implementations, selecting the execution environment for mounting the peripheral device may involve looking up the file system type in a data structure, each record of which specifies a compatibility metric value of a certain file system type and a certain execution environment, as described in more detail herein above.

In an illustrative example, the identified execution environment may be provided by a virtual machine running on the host. Accordingly, at block 440, the host agent may cause the guest agent running on the identified virtual machine to mount the peripheral device to the guest OS of the virtual machine, and the method may terminate.

Figure 5:
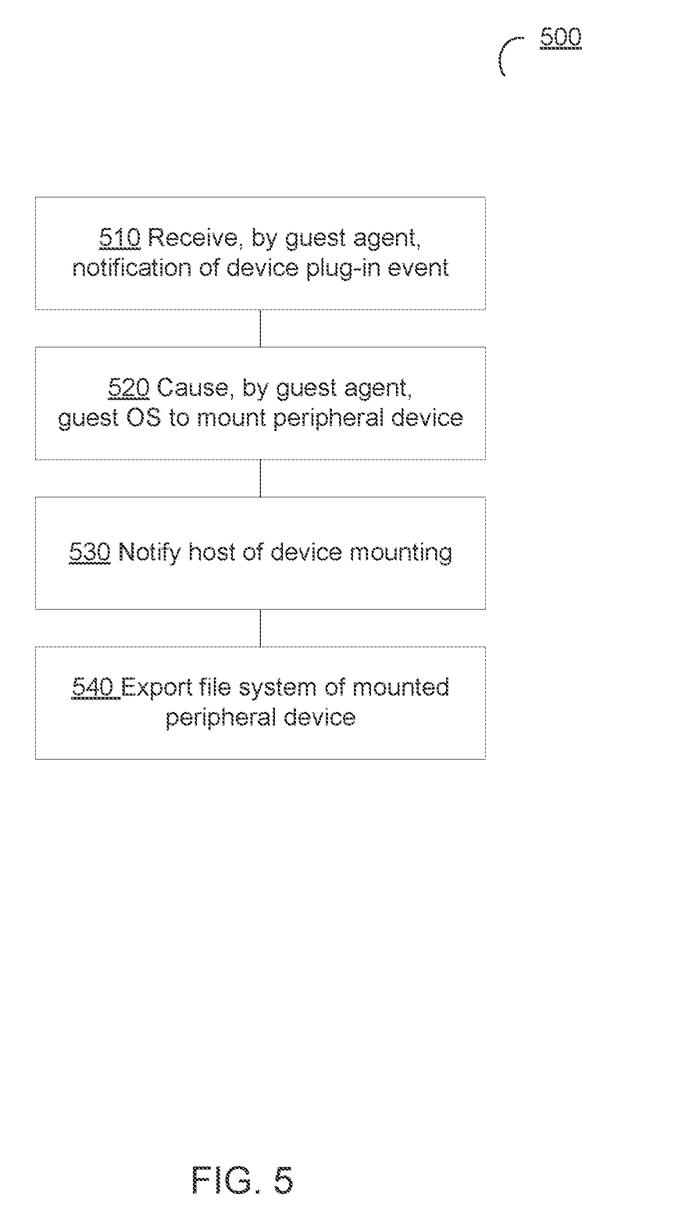

FIG. 5 depicts a flow diagram of one illustrative example of method 500 of managing peripheral devices associated with host computer systems running virtual machines, in accordance with one or more aspects of the present disclosure. Method 500 employs the guest agent 158 to cause the guest OS 157 to mount a peripheral device responsive to receiving a device plug-in notification from the host agent 175, as described herein above with reference to FIG. 2. Method 500 and/or each of its individual functions, routines, subroutines, or operations may be performed by one or more processors of the computer system (e.g., computer system 100 of FIG. 1) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, the guest agent implementing the method may receive, from the host agent running on the local or remote host computer system, a notification of a plug-in event associated with a peripheral device, as described in more detail herein above.

At block 520, the guest agent may cause the guest OS to mount the peripheral device. In an illustrative example, mounting the peripheral device may involve executing, by the guest agent, one or more system calls to the guest OS in order to install and/or activate an appropriate device driver for the peripheral device, and initialize the peripheral device, as described in more detail herein above.

At block 530, the guest agent may notify the host agent of mounting the peripheral device, as described in more detail herein above.

At block 540, the guest agent may export at least part of a file system of the peripheral device via a file system sharing protocol, and the method may terminate.

Figure 6:
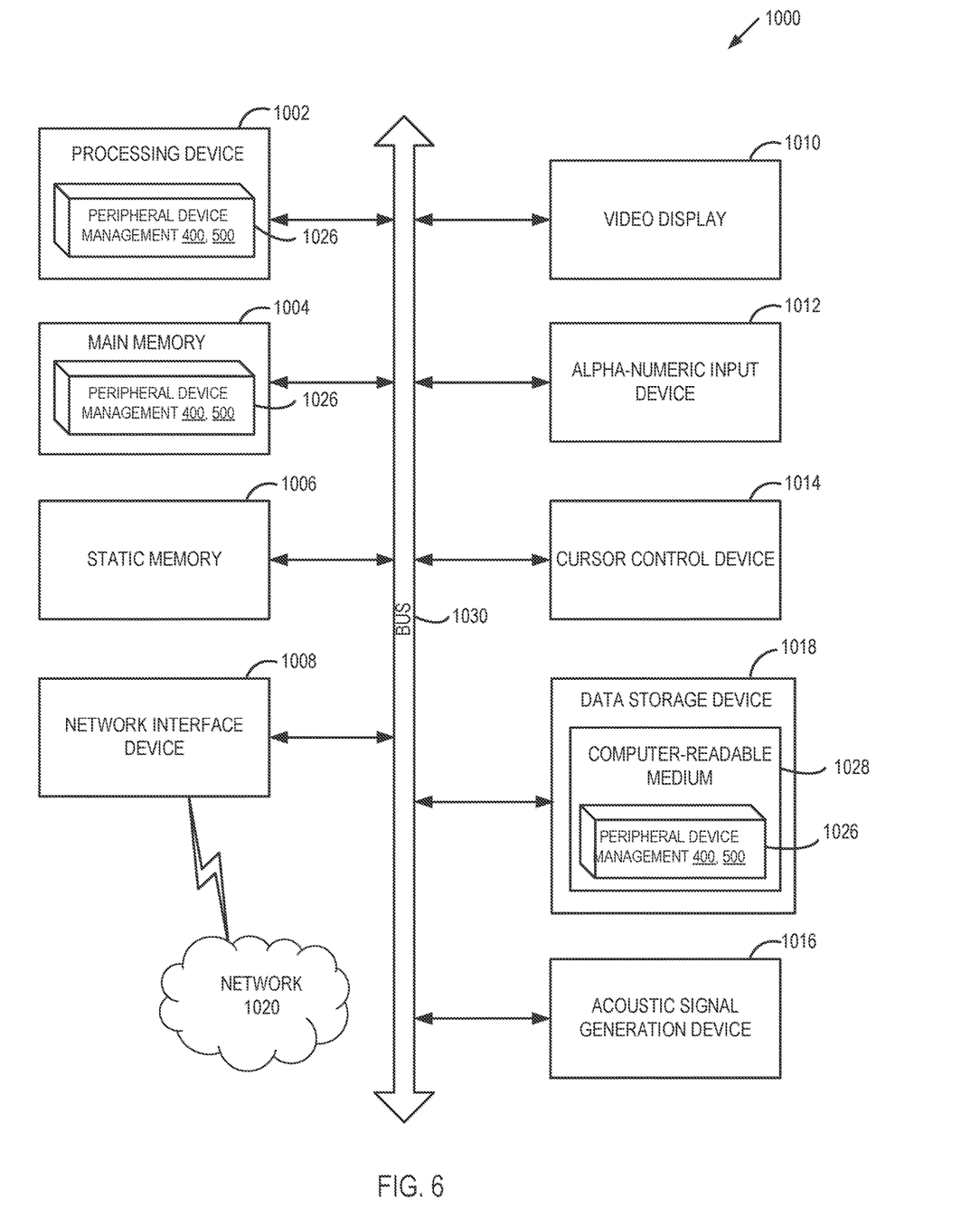
FIG. 6 depicts a block diagram of an example computer system operating in accordance with one or more aspects of the present disclosure.

FIG. 6 schematically illustrates a component diagram of an example computer system 1000 which may perform any one or more of the methods described herein. In various illustrative examples, computer system 1000 may represent example computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing methods 400-500 of managing peripheral devices associated with host computer systems running virtual machines.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of methods 400-500 of managing peripheral devices associated with host computer systems running virtual machines.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a virtual machine running on a host computer system, a notification of a plug-in event associated with a peripheral device associated with the host computer system;
mounting, by the virtual machine, the peripheral device; and
exporting, by the virtual machine, at least part of a file system of the peripheral device via a file system sharing protocol.

2. The method of claim 1, further comprising:
notifying, by the virtual machine, the host computer system of mounting the peripheral device.

3. The method of claim 1, further comprising:
notifying, by the virtual machine, a second virtual machine running on the host computer system of mounting the peripheral device.

4. The method of claim 1, wherein the peripheral device is provided by one of: a flash memory card, a compact disk, a hard disk drive (HDD) or a solid state drive (SSD).

5. The method of claim 1, wherein mounting the peripheral device further comprises:
installing a device driver for the peripheral device; and
initializing the peripheral device.

6. The method of claim 1, wherein receiving the notification is performed by a guest agent running on the virtual machine.

7. The method of claim 1, wherein the peripheral device is provided by a removable peripheral device.

8. The method of claim 1, wherein the notification comprises an identifier of the I/O interface of the host computer system to which the peripheral device is connected.

9. A host computer system comprising:
a memory; and
a processor coupled to the memory, the processor to run a virtual machine, the virtual machine to perform operations, comprising:
receiving a notification of a plug-in event associated with a peripheral device associated with the host computer system;
mounting the peripheral device; and
exporting at least part of a file system of the peripheral device via a file system sharing protocol.

10. The host computer system of claim 9, wherein the operations further comprise:
notifying the host computer system of mounting the peripheral device.

11. The host computer system of claim 9, wherein the operations further comprise:
notifying a second virtual machine running on the host computer system of mounting the peripheral device.

12. The host computer system of claim 9, wherein the peripheral device is provided by one of: a flash memory card, a compact disk, a hard disk drive (HDD) or a solid state drive (SSD).

13. The host computer system of claim 9, wherein mounting the peripheral device further comprises:
installing a device driver for the peripheral device; and
initializing the peripheral device.

14. The host computer system of claim 9, wherein receiving the notification is performed by a guest agent running on the virtual machine.

15. The host computer system of claim 9, wherein the notification comprises an identifier of the I/O interface of the host computer system to which the peripheral device is connected.

16. A non-transitory computer-readable storage medium comprising executable instructions that, when executed by a host computer system, cause a virtual machine running on the host computer system to:
receive a notification of a plug-in event associated with a peripheral device associated with the host computer system;
mount the peripheral device; and
export at least part of a file system of the peripheral device via a file system sharing protocol.

17. The non-transitory computer-readable storage medium of claim 16, further comprising instructions that, when executed by the host computer system, cause the virtual machine:
notify the host computer system of mounting the peripheral device.

18. The non-transitory computer-readable storage medium of claim 16, further comprising instructions that, when executed by the host computer system, cause the virtual machine:
notify a second virtual machine running on the host computer system of mounting the peripheral device.

19. The non-transitory computer-readable storage medium of claim 16, wherein the peripheral device is provided by one of: a flash memory card, a compact disk, a hard disk drive (HDD) or a solid state drive (SSD).

20. The non-transitory computer-readable storage medium of claim 16, wherein mounting the peripheral device further comprises:
installing a device driver for the peripheral device; and
initializing the peripheral device.

\* \* \* \* \*